United States Patent [19]
Gold

[11] 3,713,290
[45] Jan. 30, 1973

[54] GAS TURBINE ENGINE FUEL CONTROL

[75] Inventor: Harold Gold, Shaker Heights, Ohio

[73] Assignee: The United States of America as represented by the Administrator of the National Aeronautics and Space Administration

[22] Filed: May 28, 1971

[21] Appl. No.: 147,922

[52] U.S. Cl. .................................................60/39.28 R
[51] Int. Cl. .................................................F02c 9/04
[58] Field of Search...................60/39.28 R, 39.28 T

[56] References Cited

UNITED STATES PATENTS

| | | | |
|---|---|---|---|
| 2,947,141 | 8/1960 | Russ | 60/39.28 R |
| 2,972,229 | 2/1961 | Chandler et al. | 60/39.28 R |
| 3,123,128 | 3/1964 | Ziesloft | 60/39.28 R |
| 3,511,047 | 5/1970 | Yates | 60/39.28 R |

Primary Examiner—Carlton R. Croyle
Assistant Examiner—Robert E. Garrett
Attorney—N. T. Musial, J. A. Mackin and John R. Manning

[57] ABSTRACT

A variable orifice system that is responsive to compressor inlet pressure and temperature, compressor discharge pressure and rotational speed of a gas-turbine engine is incorporated into a hydraulic circuit that includes a zero gradient pump driven at a speed proportional to the speed of the engine. The resulting system provides control of fuel rate for starting, steady running, acceleration and deceleration under varying altitudes and flight speeds.

11 Claims, 7 Drawing Figures

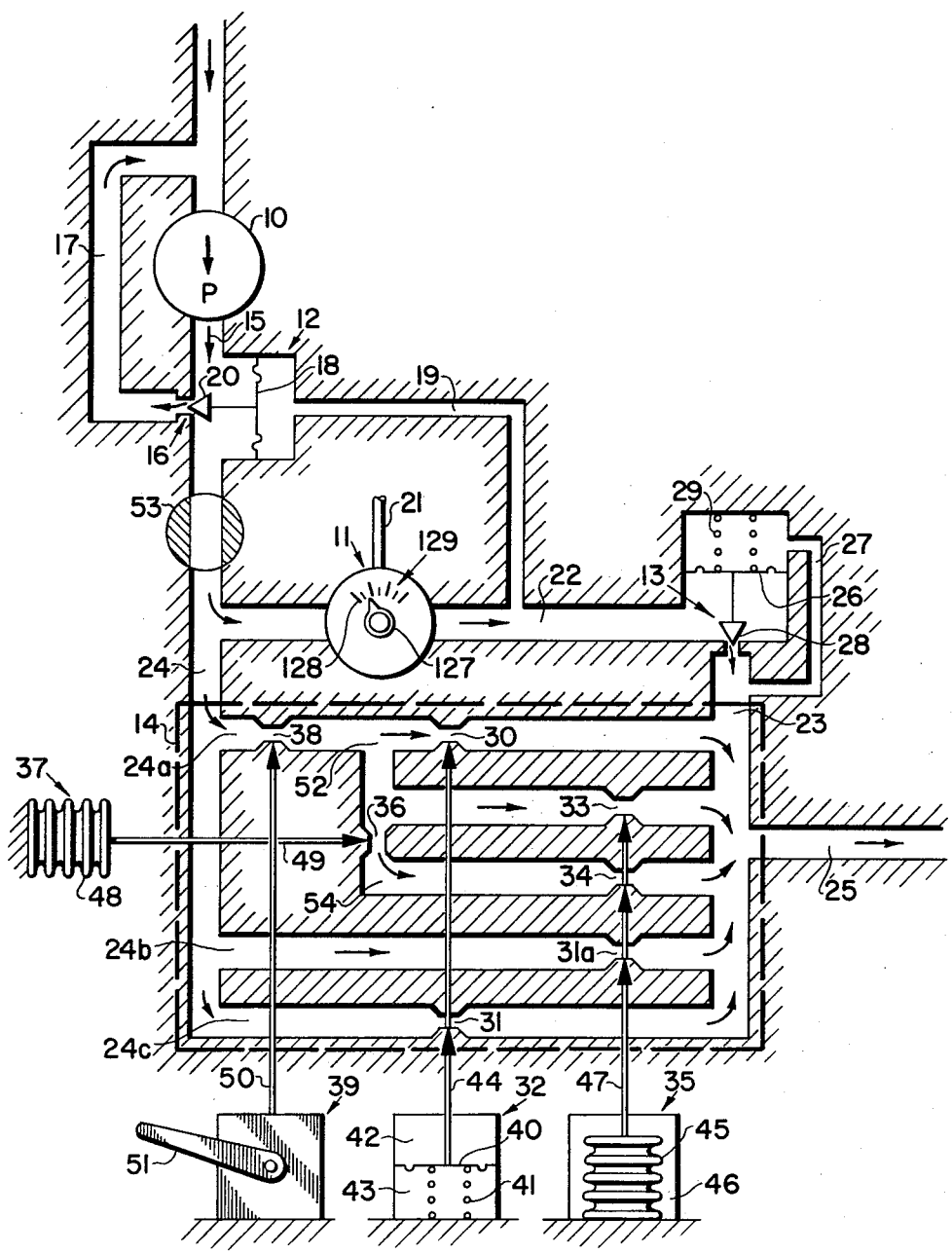
FIG. I
INVENTOR
HAROLD GOLD

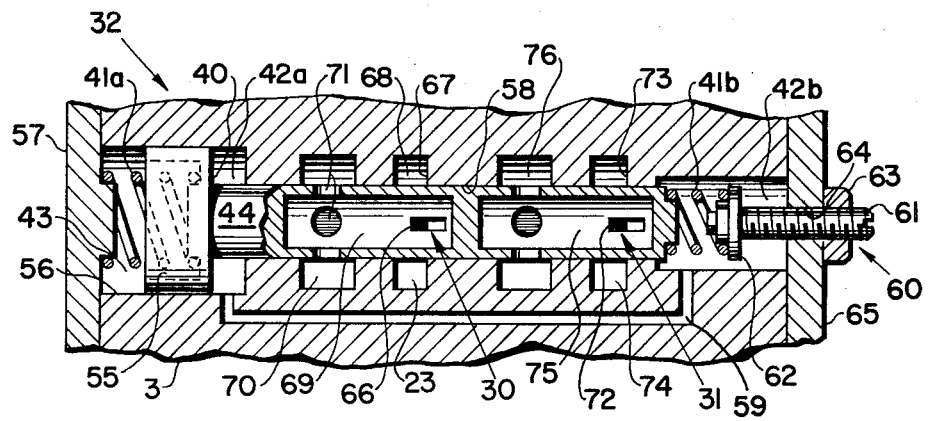
FIG. 3
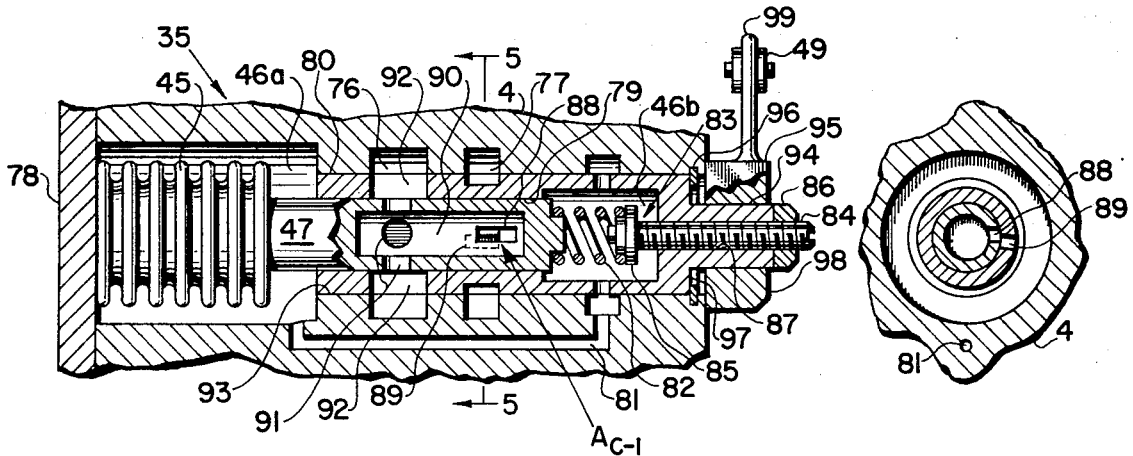
FIG. 4
FIG. 5
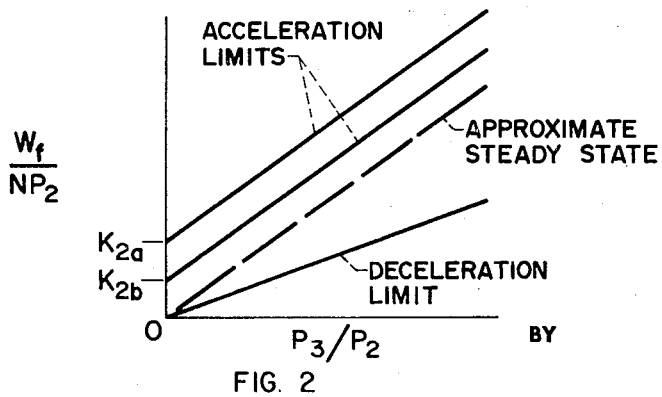
FIG. 2
INVENTOR
HAROLD GOLD
ATTORNEYS

INVENTOR
HAROLD GOLD

GAS TURBINE ENGINE FUEL CONTROL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to hydraulic control systems that are used in aircraft gas-turbine-engine fuel controls. The fuel control described in the disclosure that follows utilizes a hydraulic control circuit that was described in my U.S. Pat. No. 2,876,756 and a proportional governor system that was described in my U.S. Pat. No. 2,971,339. I have found that the hydraulic control circuit of U.S. Pat. No. 2,876,756 can be configured to function precisely in accordance with a valid law relating the maximum fuel flow rates that may be delivered to a gas-turbine engine during acceleration under varying altitude and flight speed conditions and with a similar law defining the minimum fuel flow rate that may be delivered during deceleration. The present invention provides means for the utilization of this hydraulic control circuit in gas turbine engine fuel controls that function in accordance with these acceleration and deceleration laws.

SUMMARY OF THE INVENTION

The fuel control of this invention utilizes a hydraulic mechanism for controlling the flow of fuel to an aircraft gas-turbine-engine during the operational modes of: starting, acceleration, steady running, deceleration and stopping. The system provides a proportional, closed-loop governor for steady running operation, and an open-loop metering system for controlling fuel flow rate during starting, acceleration and deceleration.

In one embodiment of the invention, both the governor and the metering system derive their response to engine speed from a positive displacement control pump that runs at a speed that is proportional to engine speed.

In a second embodiment the governor utilizes a mechanical speed responsive device. As in U.S. Pat. Nos. 2,876,756 and 2,971,339 the pressure gradient across the control pump is maintained at substantially zero by a pressure regulator to prevent pump slippage and to accomplish the metering functions.

The system provides: fuel delivery during acceleration that is in accordance with an altitude and flight speed independent law that defines the compressor surge limit; reduced fuel delivery during acceleration under high inlet air temperatures to prevent turbine over-temperature; fuel delivery during deceleration that is substantially a fixed fraction of the engine steady running fuel flow rate; fuel delivery during starting that is proportional to engine speed and is modified by compressor inlet air temperature and pressure.

In accordance with the foregoing, it is a primary object of the invention to provide a fuel control system for aircraft gas-turbine engines that delivers fuel to the engine during acceleration in accordance with an altitude and flight speed independent law.

It is a further object to provide reduced fuel delivery during acceleration under high inlet air temperature conditions.

It is another object to provide fuel delivery during deceleration that is substantially a fixed fraction of the steady running flow rate.

It is yet another object to provide fuel delivery during engine starting that is proportional to engine speed and is enriched below idle speed to promote ignitiOn.

These and other objects and features of the invention will be fully explained in the detailed description of the invention.

BRIEF DESCRIPTION OF THE DRAWINGS

The principles of the structure and methods taught by the invention are disclosed in the following specification and claims which is taken in conjunction with the accompanying drawings, in which:

FIG. 1 is a schematic diagram of the fuel control system of the invention;

FIG. 2 is a graphic presentation showing the general characteristics of the altitude and flight speed independent laws, in accordance with which the control system functions;

FIG. 3 is a fragmentary portion of the hydraulic circuit of FIG. 1 illustrating a variable orifice structure employing a pressure motor;

FIG. 4 is a fragmentary portion of the hydraulic circuit of FIG. 1 illustrating a variable orifice structure employing both a temperature and a pressure motor;

FIG. 5 is a sectional view taken through the plane 5—5 in FIG. 4;

DESCRIPTION OF THE PREFERRED EMBODIMENTS

Figure 6:
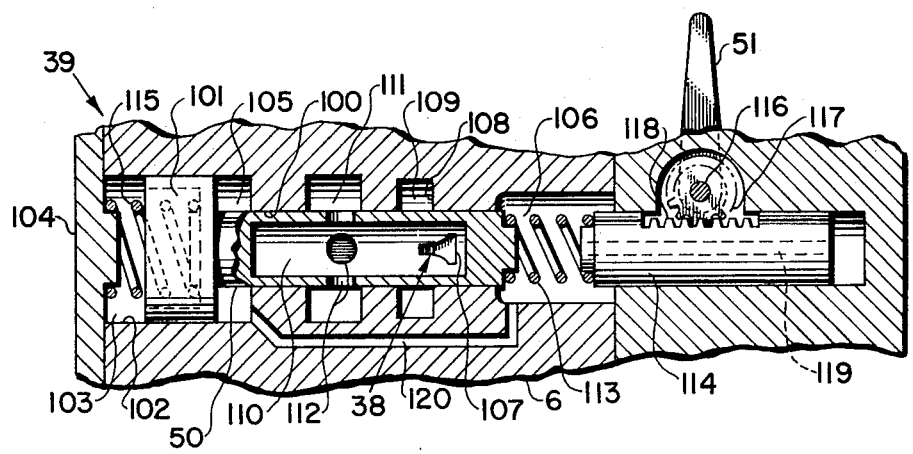
FIG. 6 is a fragmentary portion of FIG. 1 illustrating the method of utilization of a hydraulic governor.

Basic Hydraulic Control Circuit — As shown in the schematic diagram of the fuel control of FIG. 1, the system comprises the following components or subsystems: the positive displacement pump 11, the pressure regulator 12, the in-series pump orifice 13 and the bypass orifice network (enclosed by the dashed lines) 14. The direction of flow through the system is indicated by arrows.

Fuel enters the system upstream of pressure regulator 12 through conduit 15. In this schematic diagram fuel is considered to be being delivered from an engine driven, fixed displacement supply pump 10, hence regulator 12 is of the relief or return type. Regulator 12 returns flow in excess of the system demand through variable orifice 16 and through conduit 17 to the inlet to pump 10. Movable wall 18 of regulator 12 communicates with the pressure in conduit 15 and hence with the pressure upstream of pump 11. On its opposite side movable wall 18 communicates with the pressure downstream of pump 11 through passage 19. Movable wall 18 is linked by suitable means to valve element 20 and thereby varies the area of orifice 16. Movable wall 18 automatically varies the area of orifice 16 to hold the pressure in conduit 15 equal to the pressure downstream of pump 11. By virtue of this pressure regulation the pressure gradient across pump 11 is automatically held at substantially zero. Pump 11 is driven at a speed that is proportional to the speed of the gas turbine engine (hereinafter referred to as engine speed) through shaft 21. The flow discharged from pump 11 flows through conduit 22 and orifice 13 and into manifold 23. Conduit 24 joins conduit 15 and diverts flow to the bypass orifice network 14. In network 14 conduit 24 divides into conduits 24a and 24b and the network terminates at manifold 23. The flow from pump 11 and from orifice network 14 combine in manifold 23 and are conducted to the engine fuel-injection system (not shown) through conduit 25.

The pressure upstream of orifice network 14 is held equal to the pressure upstream of pump 11 by the passage junction and, as a consequence of the zero pressure gradient across pump 11, the pressure upstream of orifice network 14 is held equal to the pressure upstream of orifice 13. The pressure downstream of orifice network 14 and orifice 13 are equalized by manifold 23. As a consequence of the equalities of upstream and downstream pressures the flow through the orifice network 14 is made proportional to the flow through orifice 13. This proportionality can be expressed by the following equation:

$$Q_{14} = [A_{14}/A_{13}] Q_{13} \quad (1)$$

Where:
$Q_{14}$ — volumetric flow rate through orifice network 14
$Q_{13}$ — volumetric flow rate through orifice 13
$A_{14}$ — effective area of orifice network 14
$A_{13}$ — effective area of orifice 13

The flow rate $Q_{13}$ is equal to the flow rate discharged by pump 11, which relationship is:

$$Q_{13} = D_V N \quad (2)$$

Where:
$D_V$ — volumetric displacement per engine revolution
$N$ — engine revolution rate (engine speed)

The flow rate delivered to the engine, $Q_{26}$, is $$Q_{26} = Q_{13} + Q_{14} \quad (3)$$

Combining equations (1), (2) and (3) gives the system flow equation:

$$Q_{26} = D_V N [(A_{14}/A_{13}) + 1] \quad (4)$$

System Operation — Movable wall 26 of variable orifice 13 communicates directly with the pressure in conduit 22 and hence with the pressure upstream of orifice 13. On its opposite side movable wall 26 communicates with the pressure downstream of orifice 13 through passage 27. Movable wall 26 is linked by suitable means to valve element 28 and thereby varies the area of orifice 13. Spring 29 urges movable wall 26 and valve element 28 in the direction to reduce the area of orifice 13 and the pressure difference across orifice 13 urges the wall 26 and element 28 in the direction to increase the area of orifice 13. The bias of spring 29 is preferably set to hold orifice 13 at its minimum area from zero engine speed to the cranking speed at which ignition is initiated. As the ignited engine drives the engine speed toward idle speed the increased pressure drop across orifice 13 drives the orifice open reaching its maximum area at an engine speed slightly below idle speed. At all speeds from idle to maximum engine speed the area of orifice 13 remains fixed at the maximum value. Thus in the operating speed range orifice 13 provides a fixed reference for metering and/or governing. In the starting speed range the reduced area of orifice 13 provides an enriched flow (as may be seen from equation (4)) to promote ignition.

Variable orifice network 14 comprises: variable orifices 30 and 31 which are actuated by common pressure motor 32; variable orifices 33 and 34 which are actuated by common pressure motor 35; variable orifice 36 which is actuated by temperature motor 37; and variable orifice 38 which is actuated by governor mechanism 39.

Pressure motor 32 comprises movable wall 40, spring 41, chambers 42 and 43 and output element 44. Chamber 42 is in pressure communication with the engine compressor discharge and chamber 43 is in pressure communication with the compressor inlet. Movable wall 40 is suitably coupled by element 44 to variable orifices 30 and 31 to increase the area of orifices 30 and 31 upon an increase in compressor discharge pressure and to decrease the area of orifices 30 and 31 upon an increase in compressor inlet pressure.

Pressure motor 35 comprises evacuated bellows or anneroid element 45, one end of which is fastened in chamber 46, and output element 47. Chamber 46 is in pressure communication with the compressor inlet. Bellows 45 is suitably coupled by element 47 to variable orifices 33 and 34 to increase the area of these orifices upon an increase in compressor inlet pressure.

Temperature motor 37 comprises temperature responsive element 48 and output element 49. Element 48 is in temperature communication with the compressor inlet and is suitably coupled, by output element 49, to variable orifice 36 to decrease the area of orifice 36 upon an increase in compressor inlet temperature.

Governor mechanism 39 communicates with engine speed and is suitably coupled, by output element 50, to variable orifice 38 to decrease the area of orifice 38 upon an increase of engine speed above set speed. Lever 51 indicates the means for manually changing the set speed.

The flow through orifice 38 discharges into manifold 52. From manifold 52 fuel flows into manifold 23 through parallel orifices 30 and 33 and series orifice 36 and 34. Orifices 36 and 34 are connected by conduit 54. Fuel flowing in conduit 24b flows to manifold 23 through optional orifice 31a and fuel flowing in conduit 24c flows to manifold 23 through orifice 31. All conduits and manifolds are of sufficient cross-sectional area to make friction induced pressure gradients negligible. Orifice 31a provides an additional preciseness of fuel control and may be disposed with if desired by blocking or eliminating the conduit in which it is disposed.

Rotation of plug 53 to its closed position shuts off all flow to pump 11 and orifice network 14 as is required for shutting down an operating engine. Upon such shutoff the pressure in conduit 22 drops rapidly, allowing pressure regulator 12 to shunt back, at low pressure, the flow from the supply pump 10 during engine coast down.

Under all modes of operation the fuel delivery to the engine is in accordance with equation (4). From idle to maximum engine speed, the fuel delivery is modulated by variations in N and $A_{14}$, $A_{13}$ remaining fixed. In steady running operation $A_{14}$ is adjusted by the governor mechanism, through its variation of orifice 38, so that the fuel delivery equals the engine steady running requirement.

When the set speed is made substantially greater than the engine speed, such as occurs when lever 51 is rapidly advanced to a higher speed setting, the governor mechanism 39 drives orifice 38 to its maximum area. The resulting increase in $A_{14}$ causes the fuel delivery to increase above the steady running requirement and the engine accelerates. The increase in $A_{14}$ is limited by the other orifices of network 14. As will be demonstrated by the mathematical analysis that follows, the variation of orifices 30, 33, 36, 34 and 31 in response to engine and atmospheric parameters limits the fuel delivery during the time that orifice 38 is at maximum area so that compressor surge and/or turbine over-temperature are prevented.

When the set speed is made substantially less than the engine speed, such as occurs when lever 51 is rapidly withdrawn to a lower speed setting, governor mechanism 39 drives orifice 38 to zero area. The resulting decrease in $A_{14}$ causes the fuel delivery to decrease below the steady running requirement and the engine decelerates. The decrease in $A_{14}$ is limited by orifice 31. As will be demonstrated by the mathematical analysis that follows, the variation of orifice 31 in response to engine and atmospheric parameters limits the fuel delivery during the time that orifice 38 is at zero area so that combustor blow-out does not occur.

Correlation of System with Acceleration and Deceleration Laws — The altitude and flight speed independent law, relating the maximum fuel flow rates that may be delivered to a gas turbine engine during acceleration, that is employed in this invention, is expressed in the following relationship:

$$(w_f)/(NP_2) = K_2 + K_3(P_3/P_2) \tag{5}$$

Where:

$w_f$ — Weight flow rate of fuel to engine
$P_2$ — Compressor inlet total pressure
$P_3$ — Compressor discharge total pressure
$K_2$ — Constant
$K_3$ — Constant FIG. 2 which presents equation (5) graphically illustrates typical relative magnitudes of the parameters. In FIG. 2, $K_2$ is shown to lie between an upper value, $K_{2a}$ and a lower value, $K_{2b}$. The fuel flow rate given by the correlation of equation (5) for $K_2$ equal to $K_{2a}$ represents the maximum allowable acceleration flow rate at compressor inlet temperatures which are below a fixed temperature. This fixed temperature, which I will refer to as the design temperature, is the inlet temperature at or below which the compressor surge limited acceleration fuel flow is less than the turbine inlet temperature limited acceleration fuel flow. At compressor inlet temperatures above the design temperature the compressor surge limited fuel flow causes the turbine inlet temperature limit to be exceeded. Therefore, the maximum fuel flow rate that may be delivered during acceleration is less than the surge limited value at compressor inlet temperatures above the design temperature. The reduction in maximum acceleration fuel flow that accompanies compressor inlet temperature above the design temperature appears in the reduction in the value of $K_2$ below $K_{2a}$, in the correlation given in equation (5). $K_{2b}$ represents the value of $K_2$ at the highest compressor inlet temperature at which the engine can be accelerated to maximum design speed.

FIG. 2 further illustrates the deceleration limit that is employed in the present invention and the approximate steady running line from which the limit is derived. As illustrated, the deceleration limit is substantially a fixed fraction of the steady running fuel flow rate and which can be expressed by the following relationship.

$$(w_f)/(NP) = K_4(P_3/P_2) \tag{6}$$

Where:

$K_4 = $ Constant

In terms of the weight flow rate the system equation is from equation (4):

$$w_f = \rho_f D_V N [(A_{14}/A_{13}) + 1] \tag{7}$$

Where:

$\rho_f = $ fuel density

Rearranging equation (7) in terms of the left hand term in equations (5) and (6), I obtain for the control system:

$$w_f/NP_2 = \rho_f D_V)/P_2 [(A_{14}/A_{13}) + 1] \tag{8}$$

Letting $\rho_f D_V = D$, equation (8) becomes $$w_f/NP_2 = D/P_2 [(A_{14}/A_{13}) + 1] \tag{9}$$

Equating the right hand terms of equations (5) and (9) and solving for $A_{14}$ gives the value of $A_{14}$ required during maximum engine acceleration. Designating this value of $A_{14}$ as $A_{14a}$, the following expression is yielded:

$$A_{14a} = A_{13}[(K_2 P_2)/D - 1] + [A_{13} K_3)/D] P_3 \tag{10}$$

Equation (10) expresses the required variation of $A_{14a}$ with the absolute pressures $P_2$ and $P_3$. Because $P_3$ varies over a much larger increment of pressure than does $P_2$ it is desirable to utilize the pressure difference $(P_3 - P_2)$ rather than $P_3$ absolute. For this purpose, equation (10) can be rewritten as follows:

$$A_{14a} = A_{13}[(K_2 + K_3)/D(P_2 - 1)] + [(A_{13} K_3)/D](P_3 - P_2) \tag{11}$$

Equation (11) establishes that $A_{14a}$ is a linear function of $(P_3 - P_2)$ which has a slope equal to $[(A_{13} K_3)/D]$ and an intercept equal to $\{A_{13}[(K_2 + K_3)/D(P_2 - 1)]\}$.

Equating the right hand terms of equations (6) and (9) and solving for $A_{14}$ gives the value of $A_{14}$ required during maximum deceleration. Designating this value of $A_{14}$ as $A_{14d}$, the following expression is yielded:

$$A_{14d} = [(A_{13} K_4)/D P_3 - A_{13} \tag{12}$$

In terms of the pressure difference $(P_3 - P_2)$ equation (12) is $$A_{14d} = A_{13}[(K_4/D(P_2 - 1)] + [(A_{13} K_4)/D](P_3 - P_2) \tag{13}$$

Referring to FIG. 1, it can be seen that when orifice 38 is at zero area, the value of $A_{14}$ is equal to the effective area of orifice 31. Accordingly, at maximum deceleration:

$$A_{14d} = A_{31} \tag{14}$$

Where:

$A_{31}$ — Effective area of orifice 31

Variable orifice 31 is actuated by pressure motor 32. Motor 32 is responsive to $(P_3-P_2)$ and accordingly I set:

$$A_{31} = [(A_{13}K_4)/D] (P_3-P_2) \qquad (15)$$

By making $A_{14d}$ vary in accordance with equation (15) I neglect the term $A_{13} [(K_4/D(P_2 - 1)]$ in the system requirement equation, equation (13). This neglected term could be taken into account through the use of an additional variable orifice 31a which is in parallel with orifice 31 and is made responsive to $P_2$ by being linked to motor 35 as shown in phantom in FIG. 2. Accordingly I may set:

$$A_{31a} = A_{13} [(K_4/D\, P_2 - 1] \qquad (16)$$

$A_{31a}$ — Effective area of orifice in parallel with orifice 31

When orifice 31a is utilized:

$$A_{14d} = A_{31} + A_{31a} \qquad (17)$$

It may be seen by substituting equations (15) and (16) in equation (17) that the system requirement equation, equation (13) is mathematically satisfied. However, I find in practice that to hold $A_{31a}$ greater than zero at moderately low values of $P_2$, the pump displacement D must be impractically small (as may be inferred from equation (16)). Therefore, I find it preferable not to utilize orifice 31a.

The effect on the system output of the absence of orifice 31a can be observed by substituting equations (14) and (15) in the system equation, equation (9). This gives:

$$w_f/NP_2 = K_4 P_3 P_2 + [(D/P_2 - K_4] \qquad (18)$$

Comparison of equation (18) with equation (6) shows that the absence of orifice 31a causes the introduction of the altitude dependent term $[(D/P_2) - K_4]$ in the system output.

This effect results in an increase in the deceleration limit as the altitude is increased ($P_2$ decreased). An increase in the deceleration limit with altitude is desirable because the susceptibility of the engine combustor to blow-out during deceleration increases with altitude.

During steady running or acceleration, orifice 38 is open and fuel flows through the network of orifices that are in series with orifice 38 as well as through orifice 31. The effective area of the sub-network of orifices comprising orifices 33, 36 and 34 is given by:

$$A_{c-1} = A_{33} + \frac{A_{34}}{\sqrt{1+\left(\frac{A_{34}}{A_{36}}\right)^2}} \qquad (19)$$

Where:

$A_{c-1}$ — effective area of network of orifices 33, 34 and 36

$A_{33}$ — effective area of orifice 33
$A_{34}$ — effective area of orifice 34
$A_{36}$ — effective area of orifice 36

For values of compressor inlet temperature at or below the design temperature I set $A_{36}$ much larger than $A_{34}$, in which case equation (19) reduces to:

$$A_{c-1} = A_{33} + A_{34} \qquad (20)$$

At the maximum compressor inlet temperature $A_{38}$ is reduced to zero, in which case equation (19) reduces to:

$$A_{c-1} = A_{33} \qquad (21)$$

Orifice 30 is in parallel with the sub-network $A_{c-1}$. I now designate a second sub-network:

$$A_{c-2} = A_{30} + A_{c-1} \qquad (22)$$

Where:

$A_{c-2}$ — effective area of network of orifices 30, 33, 36 and 34

$A_{30}$ — effective area of orifice 30

Noting that $A_{c-2}$ is in series with orifice 38 and that orifice 31 is in parallel with that series pair, the effective area network 14 is $$A_{14} = A_{31} + \frac{A_{c-2}}{\sqrt{1+\left(\frac{A_{c-2}}{A_{38}}\right)^2}} \qquad (23)$$

During maximum acceleration orifice 38 is driven to maximum area. I make the maximum value of $A_{38}$ much larger than $A_{c-2}$, in which case the value of $A_{14a}$ set by the control system is, from equation (23).

$$A_{14a} = A_{31} + A_{c-2} \qquad (24)$$

$A_{31}$ was previously defined by equation (15). Substituting equation (15) in equation (24) gives:

$$A_{14a} = (A_{13}K_4)/D\,(P_3-P_2) + A_{c-2} \qquad (25)$$

Equating the right hand terms of equations (25) and (11) yields the required value of $A_{c-2}$:

$$A_{c-2} = A_{13}\left[\left(\frac{K_2+K_3}{D}\right)P_2 - 1\right] + \left[\frac{A_{13}(K_3-K_4)}{D}\right](P_3-P_2) \qquad (26)$$

Orifice 30 is responsive to $(P_3-P_2)$; therefore, I set $$A_{30} = [A_{13}(K_3-K_4)/D](P_3-P_2) \qquad (27)$$

And it follows from equation (22) that $A_{c-1}$ is required to vary in accordance with the relationship:

$$A_{c-1} = A_{13}[(K_2+K_3)/D(P_2-1)] \qquad (28)$$

At maximum compressor inlet temperature the control system establishes $A_{c-1}$ in accordance with equation (21). At this temperature the engine parameter $K_2$ is equal to $K_{2b}$. Setting $K_2 = K_{2b}$ in equation (28) and equating the right hand terms of equations (28) and (21) gives $$A_{33} = A_{13}\left[\left(\frac{K_{2b}+K_3}{D}\right)P_2 - 1\right] \qquad (29)$$

At design temperature and below the control system establishes $A_{c-1}$ in accordance with equation (20). In this temperature range the engine parameter $K_2$ is equal to $K_{2a}$. Setting $K_2 = K_{2a}$ in equation (28) and equating the right hand terms of equations (28) and (20) gives:

$$A_{34} = A_{13}\left[\left(\frac{K_{2a}+K_3}{D}\right)P_2 - 1\right] - A_{33} \qquad (30)$$

It now follows from equations (30) and (29) that:

$$A_{34} = A_{13}\left[\frac{(K_{2a}-K_{2b})}{D}\right]P_2 \qquad (31)$$

The four variable orifices: 30, 33, 34 and 31; as defined by equations (27), (29), (31) and (15), respectively, exactly match the orifice network 14 to a given set of engine coefficients ($K_{2a}$, $K_{2b}$, $K_3$ and $K_4$) and a set of control system coefficients ($D$ and $A_{13}$). This may be verified as follows:

Substituting equation (20) in equation (22) yields:

$$A_{c-2} = A_{30} + A_{33} + A_{34} \qquad (32)$$

Substituting equation (32) in equation (24) yields:

$$A_{14a} = A_{31} + A_{30} + A_{33} + A_{34} \qquad (33)$$

Now substituting equations (27), (29), (31), and (15) in equation (33) yields equation (11) where $K_2 = K_{2a}$.

And substituting equation (21) in equation (22) yields:

$$A_{c-2} = A_{30} A_{33} \qquad (34)$$

Substituting equation (34) in equation (24) yields:

$$A_{14a} = A_{31} + A_{30} + A_{33} \qquad (35)$$

Now substituting equations (27), (29), and (15) in equation (35) yields equation (11) where $K_2 = K_{2b}$.

In circumstances of engine use in which the acceleration rate that can be obtained under the limit defined by $K_{2b}$ is acceptable at low compressor inlet temperatures orifices 34 and 36 may be eliminated, in which case the sub-network comprising orifices 33, 34 and 36 is reduced to orifice 33 alone.

Operation Under Intermediate Compressor Inlet Temperatures — The effective area $A_{36}$ is reduced, by the action of motor 37, from a maximum value at the design temperature to zero at the maximum inlet temperature at which the engine can be accelerated to maximum design corrected speed. As stated previously, the value of $A_{36}$ is made much larger than $A_{34}$ at the design temperature and below. The reduction of $A_{36}$ as inlet temperature rises above design temperature is such that the sub-network area $A_{c-1}$, as defined by equation (19), reduces linearly with temperatures from $A_{33} + A_{34}$ to $A_{33}$. The reduction in the acceleration fuel delivery by the system resulting from this reduction in $A_{c-1}$ corresponds to the linear variation of the parameter $K_2$ from $K_{2a}$ to $K_{2b}$ over the temperature range.

$A_{36}$ is made to vary with inlet temperature to achieve the above specified variation of $A_{c-1}$ at sea level standard inlet pressure. This is accomplished by varying $A_{36}$ with temperature such that the value of $A_{36}$ at each value of temperature is equal to the value computed from equation (19) utilizing the required value of $A_{c-1}$ and the values of $A_{33}$ and $A_{34}$ given by equations (29) and (30), respectively, for $P_2$ equal to sea level standard pressure. Under altitude conditions where $P_2$ is reduced and correspondingly the value of $A_{34}$ reduces, the attenuation of $A_{34}$ by $A_{36}$ (see equation (19)) becomes less than at sea level. However, this effect is very small up to altitudes at and beyond which air temperatures above the design temperature (typically 59° F) do not occur.

Gas turbine engines that utilize regenerators may be employed on helicopters and turbo-propeller aircraft. Under these circumstances, compressor inlet temperatures above the design temperature could be encountered at low values of $P_2$. In this case the linear variation of the value of $A_{c-1}$ with inlet temperature in a manner that is independent of $P_2$ may be required. This manner of variation of $A_{c-1}$ can be accomplished by means of the orifice structure shown in FIGS. 4 and 5 and described in the following section of the specification.

VARIABLE ORIFICE STRUCTURES

FIG. 3 illustrates an orifice structure that may be employed to control the variable orifice pair 30 and 31 or the pair of variable orifices 33 and 34. In the configuration of FIG. 3 a pressure motor of the type indicated at 32 in FIG. 1 is employed and in consonance with that numerals identifying orifices 30 and 31 are employed. However, it may be readily seen that by the substitution of a pressure motor of the type indicated at 35 in FIG. 1, the structure would be equally functional for the orifice pair 33 and 34.

In FIG. 3 movable wall 40 comprises piston 55 which mates slidably with bore 56 of housing body 3. Chamber 43 which communicates with $P_2$ is formed by bore 56 and end cap 57. Element 44 is a cylinder that is coupled to and is coaxial with piston 55. Cylinder 44 mates slidably with bore 58 and extends through bore 58 to project into chamber 42b. Chamber 42b communicates with chamber 42a through passage 59. Chambers 42a and 42b communicate with $P_3$. By virtue of the foregoing communications the area of the assembly acted upon by $P_3$ is equal to the area acted upon by $P_2$. Spring 41 of FIG. 1 is divided into two parts, 41a and 41b, in the configuration of FIG. 3. Adjustable spring base 60 engages spring 41b and provides a means for axial adjustment of the assembly. Spring base 60 comprises screw 61, head 62 and lock nut 63. Head 62 is rotatably coupled to screw 61. Screw 61 engages threaded hole 64 of end cap 65. Variable orifice 30 is formed by the cooperative action of rectangular slot 66 of cylinder 44 and surface 67 of annulus 68. Slot 66 opens into chamber 69 of cylinder 44 and chamber 69 communicates with annulus 70 through holes 71. Annulus 70 communicates with manifold 52. Rectangular slot 66 provides the linear variation of $A_{30}$ with $(P_3 - P_2)$ as specified by equation (27). Variable orifice 31 is formed by the cooperative action of rectangular slot 72 of cylinder 44 and the surface 73 of annulus 74. Slot 72 opens into chamber 75 of cylinder 44 and chamber 75 communicates with annulus 74 through holes 76. Annulus 74 communicates with conduit 24b. Rectangular slot 72 provides the linear variation of $A_{31}$ with $(P_3 - P_2)$ as specified by equation (15).

The variable orifice structure illustrated in FIG. 4 performs the function of the network of orifices comprising orifices 33, 34 and 36. Accordingly, the upstream annulus 76 in housing body 4 communicates with manifold 52 and the downstream annulus 77 communicates with manifold 23. Evacuated bellows 45 of pressure motor 35 is coupled to end cap 78 of chamber 46a. Element 47 is a cylinder that is coupled to and is coaxial with bellows 45. Cylinder 47 mates slidably with bore 79 of sleeve 80 and extends through bore 79 to project into chamber 46b of sleeve 80. Chamber 46b communicates with chamber 46a through passage 81. Chambers 46a and 46b communicate with $P_2$. By virtue of the foregoing communications, $P_2$ acts on the entire pressure area of bellows 45. Spring 82 coacts with the spring characteristics of bellows 45 and its rate is selected to provide the assembly with the desired axial-displacement to pressure-increment response. Adjustable spring base 83 engages spring 82 and provides a means for axial adjustment of the assembly. Spring base 83 comprises screw 84, head 85 and lockout 86. Head 85 is rotatably coupled to screw 83. Screw 84 engages threaded hole 87 of sleeve 80. Variable orifice $A_{c-1}$ is formed by the cooperative action of rectangular slot 88 of cylinder 47 and rectangular slot 89 of sleeve 80. Slot 88 opens into chamber 90 of cylinder 47 and chamber 90 communicates with annulus 76 through holes 91 in cylinder 47 and holes 92 in sleeve 80. Sleeve 80 is externally a cylinder that is coaxial with bore 79 and mates rotatably with bore 93. Shaft 94 of sleeve 80 projects out of housing body 4 where it is engaged by level 95. Snap ring 96 engages bore 93 and shoulder 97 of sleeve 80 to prevent outward axial movement. Collar 98 of level 95 clamps shaft 94 to provide for rotation of sleeve 80 and collar 98 projects beyond bore 93 to axially lock sleeve 80 against snap ring 96. Arm 99 of lever 95 is coupled to temperature motor 48 by element 49. As may be observed in FIG. 4, $A_{c-1}$ varies linearly with $P_2$ through the axial movement of cylinder 47 and as may be observed in FIGS. 4 and 5 varies linearly with the rotation of sleeve 80 with respect to cylinder 47 at all axial position of cylinder 47. Cylinder 47 is prevented from rotating by its engagement to bellows 45.

SPEED RESPONSIVE MOTOR AND GOVERNOR ACTION

FIG. 6 illustrates the principal elements of a speed responsive variable orifice of the type described in U.S. Pat. No. 2,971,339. Element 50 is a cylinder that mates slidably with bore 100 of housing body 6 and is integral with coaxial cylinder 101. Cylinder 101 mates slidably with bore 102. Chamber 103 which communicates with conduits 24a is formed by bore 102 and end cap 104. Chamber 105 communicates with chamber 106 through passage 120 and chambers 105 and 106 communicate with manifold 23. By virtue of the foregoing communications the area of the assembly acted upon by the pressure in manifold 23 is equal to the area acted upon by the pressure in conduit 24a. Variable orifice 38 is formed by the cooperative action of contoured slot 107 in cylinder 50 and the surface 108 of annulus 109. Slot 107 opens into chamber 110 of cylinder 50 and chamber 110 communicates with annulus 111 through holes 112. Annulus 111 communicates with conduit 24a and annulus 109 communicates with manifold 52. Loading spring 113 engages the end of cylinder 50 in chamber 106 and adjustable spring base 114. Bias spring 115 engages piston 101 and end cap 104. Bias spring 115 is not essential to the operation of the speed responsive variable orifice but provides mechanical advantages that are well known to those skilled in the art. In all conditions of operation the net spring force is in the direction of the force exerted by spring 113. Lever 51 is coupled by shaft 116 to gear 117. Gear 117 engages rack 118 in spring base 114. Spring base 114 is cylindrical and slidably mates with bore 118. Passage 119 in spring base 114 equalizes the pressures on opposite ends of the spring base. Under steady running of the engine the net spring force is in equilibrium with the net pressure force. The pressure force is equal to the product of the area of piston 101 and the difference in pressure between passage 24a and manifold 23. As previously explained, this pressure difference is equal to the pressure drop across orifice 13. From idle speed and above the area of orifice 13 is fixed and thereby provides an accurate speed reference. From equation (2) the pressure drop across orifice 13 is $$\Delta P_{13} = (D_v^2 \rho_f N2)/(2g A^2_{13}) \quad (36)$$

Where:
$\Delta P_{13}$ — pressure drop across orifice 13
$\rho_f$ — fuel density
$g$ — acceleration of gravity Equating the net spring force to the net pressure force the equilibrium speed is $$N = A_{13}/D_v \sqrt{(2g F_s)/(A_{101} \rho_f)} \quad (37)$$

Where:
$F_s$ — net spring force
$A_{101}$ — area of piston 101

Slot 107 is contoured to provide the governor gain variation that is necessary for system stability over the speed and altitude range of operation. I find that a contour that provides a substantially logarithmic variation of orifice 36 area with the axial displacement of cylinder 50 is satisfactory for stability.

Figure 7:
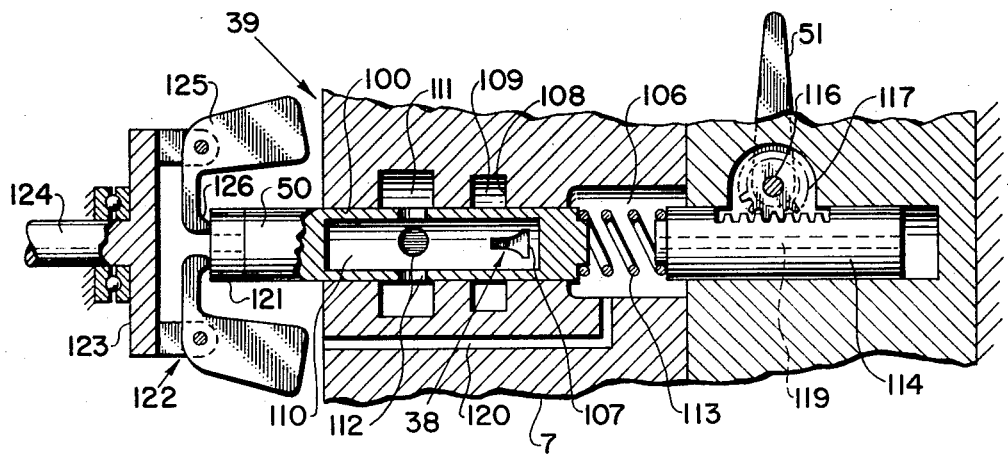
FIG. 7 is a fragmentary portion of FIG. 1 illustrating the method of utilization of a fly-weight governor.

The utilization of a fly-weight type speed-responsive motor is illustrated in FIG. 7. The variable orifice structure and the loading spring base mechanism illustrated in FIG. 7 are identical to that illustrated in FIG. 6 and therefore the identical parts bear the same numerals in both figures. In FIG. 7 cylinder 50 projects out of housing body 7 and is fitted at its extremity with thrust bearing 121. Fly-weight assembly 122 comprises carrier 123, shaft 124, weight 125 and weight arms 126. Shaft 125 is carried in suitably bearings (not shown) and is coupled to the engine shaft by suitable means, (not shown). Passage 120 equalizes the pressure in chamber 106 and the fly-weight chamber. The action of fly-weight governors is well known and need not be described. However, it is noteworthy that feed back force is proportional to the square of speed as is the case of the governor mechanism of FIG. 6. Therefore the stabilizing shape of slot 107 may be the same for both governors. Furthermore, any governor mechanism can be utilized to vary the area of orifice 38, provided its gain and dynamic characteristics are suitable for the particular engine and the maximum area the associated orifice 38 meets the requirements of network 14.

With respect to the requirement of network 14, it can be seen from equation (23) that for a maximum value of $A_{38}$ that provides:

$(A_{38}/A_{c-2}) > (4)$ the attenuation of $A_{c-2}$, as it appears in equation (23), is 3 percent. For a given maximum value of $A_{38}$ the greatest attenuation of $A_{c-2}$ will occur during sea level operation near 100 percent design speed, at which condition $A_{c-2}$ is at its greatest value. The attenuation of $A_{c-2}$ by as great as 10 percent under sea level operation near 100 percent design speed produces only a negligible decrease in the acceleration rate of the engine.

COMPENSATION FOR FUEL DENSITY VARIATIONS

As shown by equation (7) the weight flow rate delivered by the system is directly proportional to the fuel density. This effect of fuel density on the acceleration and deceleration limits can be eliminated by providing a means by which the displacement of pump 11 per revolution of the engine ($D_v$) can be varied to hold the product ($D_v \rho_f$) constant. Because the range of deviation of fuel density from the mean normally encountered is less than 5 percent, the range of pump displacement variation required is small. Because of this small requirement and because the pump operates in zero pressure gradient, the adjustability is readily found in any of several positive displacement pump types, including gear pumps. Knob 127 shown on pump 11 in FIG. 1 and the density scale indicated at 128 shows the manner in which the operator may adjust the system to a known fuel density.

When the product $D_v$ $\rho_f$ is held constant the equilibrium speed provided by the hydraulic governor of FIG. 6 is $$N = A_{13}/D \sqrt{2g F_s \rho_f)/A_{101}} \qquad (38)$$

It is observable from comparison of equations (37) and (38) that the adjustment of $D_v$ to eliminate the effect of fuel density on the acceleration and deceleration limits does not eliminate or magnify the effect of fuel density on the equilibrium speed of the hydraulic governor, but changes the direction of the effect. In either event a change of fuel density of 5 percent results in only a 2½ percent change in equilibrium speed. This effect is observable only at the 100 percent and idle speed stops provided for lever 51, and may be compensated for by adjustment of these stops. Therefore, through the use of cams and the like, the fuel density adjustment and the speed stop adjustment can be made from a single input.

What is claimed is:

1. A fuel control for a gas-turbine engine comprising a liquid fuel supply means, means for pressurizing the liquid, a positive displacement pump operating at a speed proportional to the speed of the engine, pressure responsive means operating in conjunction with said pressurizing means to maintain the pressure gradient across said pump at zero, a conduit for receiving the flow from said pump, flow restriction means in said conduit, a branch conduit for diverting flow from the upstream side of said pump, second flow restriction means in said branch conduit, said conduits being joined downstream of said first mentioned flow restrictions means, whereby the pressure difference across said second flow restriction means is made equal to the pressure difference across said first mentioned flow restriction means and said flows are combined, a third conduit for delivering said combined flow to the engine; the second mentioned flow restriction means being a network of variable orifices, said network comprising: a first variable orifice and a second variable orifice responsive to the difference between compressor discharge pressure and compressor inlet pressure, a third variable orifice responsive to engine speed and a fourth variable orifice responsive to compressor inlet absolute pressure; said first variable orifice and said fourth variable orifice forming a parallel array, said parallel array and said third variable orifice forming a series pair, said series pair and said second variable orifice forming a second parallel array; said third variable orifice being operable to regulate the rate of fuel delivery to the engine during steady running, the first mentioned parallel array and said second variable orifice being operable to limit the maximum rate of fuel delivery during engine acceleration and said second variable orifice being operable to limit the minimum rate of delivery of fuel to the engine during engine deceleration.

2. In the system of claim 1, said first mentioned flow restriction means being a spring biased, pressure responsive variable orifice, said variable orifice being responsive to said spring bias and the pressure difference across said variable orifice, said variable orifice being thereby responsive to the rate of flow from said pump, and being so disposed to open gradually from cranking speed to idle speed and to remain at fixed opening above idle speed.

3. In the orifice network of claim 1, a fifth variable orifice responsive to compressor inlet absolute pressure and a sixth variable orifice responsive to compressor inlet temperature, said fifth and said sixth variable orifice forming a second series pair, said second series pair and said fourth variable orifice forming a parallel array, said sixth variable orifice being operable above a specified temperature to reduce the limit of maximum rate of fuel delivery during engine acceleration.

4. In the orifice network of claim 1, said fourth variable orifice being responsive to compressor absolute inlet pressure and to compressor inlet temperature.

5. In claim 4, said fourth variable orifice comprising an orifice structure, said structure comprising a cylindrical sleeve and a mating cylindrical piston, said piston having an axial bore, a slot being through the wall of said piston and opening into said bore, a second slot being through the wall of said sleeve, said piston being coupled to a linear actuator, said linear actuator being responsive to compressor inlet pressure, said sleeve being coupled to a rotary actuator, said rotary actuator being responsive to compressor inlet temperature, said slots being overlapped to form said variable orifice, the area of said orifice being variable through the axial displacement of said piston and/or the rotary displacement of said sleeve, the interior of said piston being in communication with a point between said first and third orifices and said second slot being in communication with said third conduit.

6. In the orifice network of claim 1, said third variable orifice comprising an orifice structure, said structure being actuated by a pressure responsive, spring biased movable wall, said wall being between a first and a second pressure chamber, said first chamber being in communication with the pressure upstream of said network, said second chamber being in communication with the pressure downstream of said orifice network.

7. In the orifice network of claim 1, said third variable orifice comprising an orifice structure, said structure being actuated by a spring biased fly-weight mechanism, said mechanism being driven at a speed proportional to the speed of said engine.

8. In claim 1, said positive displacement pump being of the adjustable displacement type.

9. In the orifice network of claim 1, said first and said second variable orifices comprising a multi-orifice structure, said structure comprising a cylindrical valve spool and a mating valve sleeve, a pair of separate chambers in said spool, each chamber being provided with an inlet opening and an outlet opening in the wall of said spool, an inlet annulus in said sleeve at each inlet opening, an outlet annulus in said sleeve at each outlet opening, said outlet annuluses communicating with said third conduit, said inlet annulus of one chamber communicating with the upstream side of said third orifice, said inlet annulus of the other chamber communicating with the downstream side of said third orifice, said outlet annuluses being axially positioned such that axial movement of said spool varies the area of each outlet exposed to respective outlet annuluses to provide variable orifices, a coaxial cylindrical piston coupled to said spool, said spool and said piston defining a spool assembly, a pair of opposing springs axially restraining said spool assembly and passage means communicating compressor inlet pressure to the piston end of said spool assembly and compressor discharge pressure to the opposite side of said piston and opposite end of said spool.

10. In a gas-turbine engine fuel control system of the type utilizing a zero-gradient pump and a flow control means connected serially between a fuel supply pump and a conduit which delivers fuel to a fuel injection system, the improvement comprising; a second flow control means connected between the output of said fuel supply pump and said conduit, said second flow control means comprising first and second variable orifices connected serially between the output of said fuel supply pump and said conduit, a third variable orifice connected in parallel with said second orifice, fourth and fifth variable orifices connected in series relationship to each other and in parallel with said third orifice, a sixth variable orifice connected between the output of said fuel supply pump and said conduit, means for varying the area of said first variable orifice in proportion to engine speed, means for varying the area of said third and fifth variable orifices in accordance with compressor inlet pressure, means for varying the area of said fourth variable orifice inversely with inlet temperature, and, means for varying the area of said second and sixth variable orifices in accordance with compressor discharge pressure and inversely to compressor inlet pressure.

11. The fuel control system of claim 10 and including: a seventh variable orifice connected in parallel with said sixth variable orifice, the area of said seventh variable orifice being controlled by said means for varying the area of said third and fifth variable orifices.

* * * * *